US012592733B2

(12) United States Patent
Kleinerman et al.

(10) Patent No.: US 12,592,733 B2
(45) Date of Patent: Mar. 31, 2026

(54) TONE TRACKING AND CANCELLATION FOR RADIO RECEIVERS

(71) Applicant: Skyworks Solutions, Inc., Irvine, CA (US)

(72) Inventors: Alexander Kleinerman, Austin, TX (US); Connor William Blasie, Austin, TX (US)

(73) Assignee: Skyworks Solutions, Inc., Irvine, CA (US)

( * ) Notice: Subject to any disclaimer, the term of this patent is extended or adjusted under 35 U.S.C. 154(b) by 13 days.

(21) Appl. No.: 18/597,595

(22) Filed: Mar. 6, 2024

(65) Prior Publication Data

US 2024/0305325 A1 Sep. 12, 2024

Related U.S. Application Data

(60) Provisional application No. 63/489,388, filed on Mar. 9, 2023.

(51) Int. Cl.
*H04B 1/12* (2006.01)
*H04L 5/00* (2006.01)
*H04L 27/26* (2006.01)

(52) U.S. Cl.
CPC ........... *H04B 1/123* (2013.01); *H04L 5/0007* (2013.01); *H04L 27/2691* (2013.01)

(58) Field of Classification Search
CPC ............... H04L 27/2691; H04L 5/0007; H04L 27/2647; H04B 1/123
See application file for complete search history.

(56) References Cited

U.S. PATENT DOCUMENTS

| | | | |
|---|---|---|---|
| 6,470,047 B1 | 10/2002 | Kleinerman et al. | |
| 6,862,326 B1 | 3/2005 | Eran et al. | |
| 6,980,602 B1 | 12/2005 | Kleinerman et al. | |
| 7,065,371 B1 | 6/2006 | Kleinerman | |
| 8,897,278 B2 * | 11/2014 | Kimura ............... | H04L 27/2655 375/260 |
| 9,558,062 B2 | 1/2017 | Cohen et al. | |
| 9,647,705 B2 | 5/2017 | Pack et al. | |
| 10,530,527 B1 * | 1/2020 | Wilson ................... | H04L 1/006 |
| 11,140,014 B1 | 10/2021 | Kleinerman | |
| 11,381,267 B1 * | 7/2022 | Kleinerman ...... | H04L 27/26524 |
| 11,652,667 B2 | 5/2023 | Kleinerman | |
| 11,729,028 B2 | 8/2023 | Kleinerman et al. | |
| 12,206,526 B2 | 1/2025 | Kleinerman et al. | |
| 12,244,438 B2 | 3/2025 | Kleinerman | |
| 12,348,350 B2 | 7/2025 | Kleinerman et al. | |
| 2004/0114675 A1 * | 6/2004 | Crawford ........... | H04L 27/2657 375/327 |

(Continued)

*Primary Examiner* — Khanh C Tran
(74) *Attorney, Agent, or Firm* — Knobbe, Martens, Olson & Bear, LLP

(57) ABSTRACT

Aspects of this disclosure relate to canceling a tone in a radio signal. A location of an interfering tone can be estimated in an orthogonal frequency division multiplexing symbol (OFDM). An interfering tone can be detected in a subsequent OFDM symbol based on the estimate of the location of the interfering tone in the OFDM using closed loop tone detection. The interfering tone in the subsequent OFDM can be canceled. Tone cancellation can be performed using digital signal processing circuitry. Tone cancellation can be performed in radio systems.

20 Claims, 9 Drawing Sheets

(56)         References Cited

U.S. PATENT DOCUMENTS

| | | | |
|---|---|---|---|
| 2010/0219876 A1* | 9/2010 | Popescu ............... | H04B 1/1036 |
| | | | 327/361 |
| 2010/0284266 A1* | 11/2010 | Jang ................... | H04L 25/0222 |
| | | | 370/252 |
| 2014/0086362 A1* | 3/2014 | Dhayni ............... | H04L 27/2691 |
| | | | 375/329 |
| 2017/0366210 A1 | 12/2017 | Pande et al. | |
| 2019/0349947 A1* | 11/2019 | Bai ...................... | H04L 5/0007 |
| 2022/0190858 A1* | 6/2022 | Kleinerman ......... | H04B 1/1027 |
| 2024/0275659 A1 | 8/2024 | Cassaro et al. | |
| 2024/0333329 A1 | 10/2024 | Wallace et al. | |
| 2024/0333564 A1 | 10/2024 | Kleinerman et al. | |
| 2024/0333573 A1 | 10/2024 | Kleinerman et al. | |
| 2024/0396785 A1 | 11/2024 | Blasie et al. | |
| 2025/0310153 A1 | 10/2025 | Kleinerman et al. | |

* cited by examiner

50

52 — ESTIMATE TONE OF OFDM SYMBOL

54 — GENERATE VECTOR FOR NEXT OFDM SYMBOL CENTERED AT ESTIMATED TONE

56 — COMPUTE FREQUENCY COMPONENTS OF VECTOR

58 — DETERMINE FREQUENCY BIN OF TONE WITH GREATEST MAGNITUDE

60 — REMOVE TONE

TONE TRACKING AND CANCELLATION FOR RADIO RECEIVERS

CROSS REFERENCE TO PRIORITY APPLICATION

Any and all applications for which a foreign or domestic priority claim is identified in the Application Data Sheet as filed with the present application are hereby incorporated by reference under 37 C.F.R. § 1.57. This application claims the benefit of priority of U.S. Provisional Application No. 63/489,388, filed Mar. 9, 2023 and titled "TONE TRACKING AND CANCELLATION FOR RADIO RECEIVERS," the disclosure of which is hereby incorporated by reference in its entirety and for all purposes.

BACKGROUND

Technical Field

The disclosed technology relates to radio receivers. Embodiments disclosed herein relate to tracking and canceling an interfering tone of a radio signal.

Description of Related Technology

Digital radio technology involves transmitting digital signals in the radio spectrum. In digital broadcasting systems, analog signals can be digitized and transmitted using a digital modulation scheme. Receiving devices can receive and process a digital radio signal.

Radio receivers are implemented in a variety of applications. In addition to standalone radios for receipt of broadcast radio signals, a wide variety of devices can include a radio receiver (and often paired with a transmitter). Modem circuitry can be present in any device having wireless capabilities. While some broadcast radio signals are transmitted with analog coding (e.g., amplitude modulation (AM) and frequency modulation (FM) signals), other terrestrial and satellite wireless communication systems use digital encoding. Example digital radio systems include systems can be implemented in accordance with National Radio System Committee (NRSC-5C, also known as HD™ radio), Digital Audio Broadcasting (DAB), Digital Radio Mondiale (DRM), Convergent Digital Radio (CDR), or another suitable digital radio standard.

In certain communication systems, noise and/or interference sources can be present. For instance, a tone interference can be a result of co-channel interference. Improved systems and methods for removing an interfering tone are desired.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a method of tone cancellation for a radio signal. The method includes generating an estimate of a location of an interfering tone in a first orthogonal frequency division multiplexing symbol. The method includes detecting, using closed loop tone detection, an interfering tone in a second orthogonal frequency division multiplexing symbol based on the estimate of the location of the interfering tone in the first orthogonal frequency division multiplexing symbol. The method also includes canceling the interfering tone in the second orthogonal frequency division multiplexing symbol based on the detecting the interfering tone of the second orthogonal frequency division multiplexing symbol. The method is performed using digital signal processing circuitry.

The first and second orthogonal frequency division multiplexing symbols can be consecutive orthogonal frequency division multiplexing symbols.

Detecting the interfering tone can include generating a vector for a portion of a bandwidth of the second orthogonal frequency division multiplexing symbol based on the estimate of the location of the interfering tone, and determining a frequency component of the vector having a greatest magnitude. The vector can be centered at the estimate of the location of the interfering tone in the first orthogonal frequency division multiplexing symbol.

The method can include detecting, using closed loop tone detection, an interfering tone in a third orthogonal frequency division multiplexing symbol based on detecting the interfering tone in the second orthogonal frequency division multiplexing symbol. The method of can include detecting, using closed loop tone detection, an interfering tone in a plurality of additional orthogonal frequency division multiplexing symbols.

The method can include detecting, using closed loop detection, a second interfering tone in the second orthogonal frequency division multiplexing symbol and canceling the second interfering tone in the second orthogonal frequency division multiplexing symbol.

The method can include receiving a radio signal at one or more antennas and processing the radio signal to generate the first orthogonal frequency division multiplexing symbol. The first orthogonal frequency division multiplexing symbol can be generated from a received digital broadcast radio signal.

Another aspect of this disclosure is a radio system with tone cancellation. The radio system includes at least one antenna configured to receive a radio signal and a radio receiver configured to process the radio signal to generate orthogonal frequency division multiplexing symbols. The radio receiver includes digital signal processing circuitry configured to generate an estimate of a location of an interfering tone in a first symbol of the orthogonal frequency division multiplexing symbols, determine an interfering tone in subsequent symbol of the orthogonal frequency division multiplexing symbols using closed loop tone detection that is based on the estimate of the location of the interfering tone in the first symbol, and cancel the interfering tone in the subsequent symbol.

The digital signal processing circuitry can detect the interfering tone in the subsequent symbol by at least generating a vector for a portion of a bandwidth of the subsequent symbol based on the estimate of the interfering tone and determining a frequency component of the vector having a greatest magnitude. The vector can be centered at the estimate of the location of the interfering tone in the first symbol.

The digital signal processing circuitry can detect, using closed loop tone detection, an interfering tone in a plurality of additional symbols of the orthogonal frequency division multiplexing symbols. The digital signal processing circuitry can detect, using closed loop detection, a second interfering tone in the subsequent symbol.

The radio signal can be a digital broadcast radio signal.

The first symbol and the subsequent symbol can be consecutive symbols of the orthogonal frequency division multiplexing symbols.

Another aspect of this disclosure is digital signal processing circuitry for tone cancellation. The digital signal processing circuitry includes a tone estimation circuit, a Fourier transform engine, and a tone cancellation circuit. The tone estimation circuit is configured to generate an estimate of an interfering tone of a first orthogonal frequency division multiplexing symbol. The Fourier transform engine is configured to generate a vector for a portion of a bandwidth of a second orthogonal frequency division multiplexing symbol based on the estimate of the interfering tone of the first orthogonal frequency division multiplexing symbol. The vector includes frequency domain components. The tone cancellation circuit is configured to cancel the interfering tone in the second orthogonal frequency division multiplexing symbol based on a frequency component of the frequency domain components having a greatest magnitude.

The vector can be centered at the estimate of the interfering tone of the first orthogonal frequency division multiplexing symbol.

The digital signal processing circuitry can include a tone analysis circuit configured to determine the frequency component having the greatest magnitude.

The Fourier transform engine can generate a vector for a portion of a bandwidth of a third orthogonal frequency division multiplexing symbol based on the frequency component having the greatest magnitude.

Another aspect of this disclosure is a method of canceling a tone in a radio signal. The method includes generating a vector for an orthogonal frequency division multiplexing symbol based on an estimated interfering tone of a previous orthogonal frequency division multiplexing symbol, the vector including frequency components for a portion of a bandwidth of the orthogonal frequency division multiplexing symbol; and canceling a tone in the orthogonal frequency division multiplexing symbol based on a frequency component of the frequency components of the vector having a greatest magnitude, the method performed using digital signal processing circuitry.

The method can include estimating the estimated interfering tone of the previous orthogonal frequency division multiplexing symbol. Canceling the tone can be performed in a closed loop of the digital signal processing circuitry.

The method can include receiving a radio signal at one or more antennas and processing the radio signal to generate the orthogonal frequency division multiplexing symbol. The orthogonal frequency division multiplexing symbol can be generated from a received digital broadcast radio signal.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
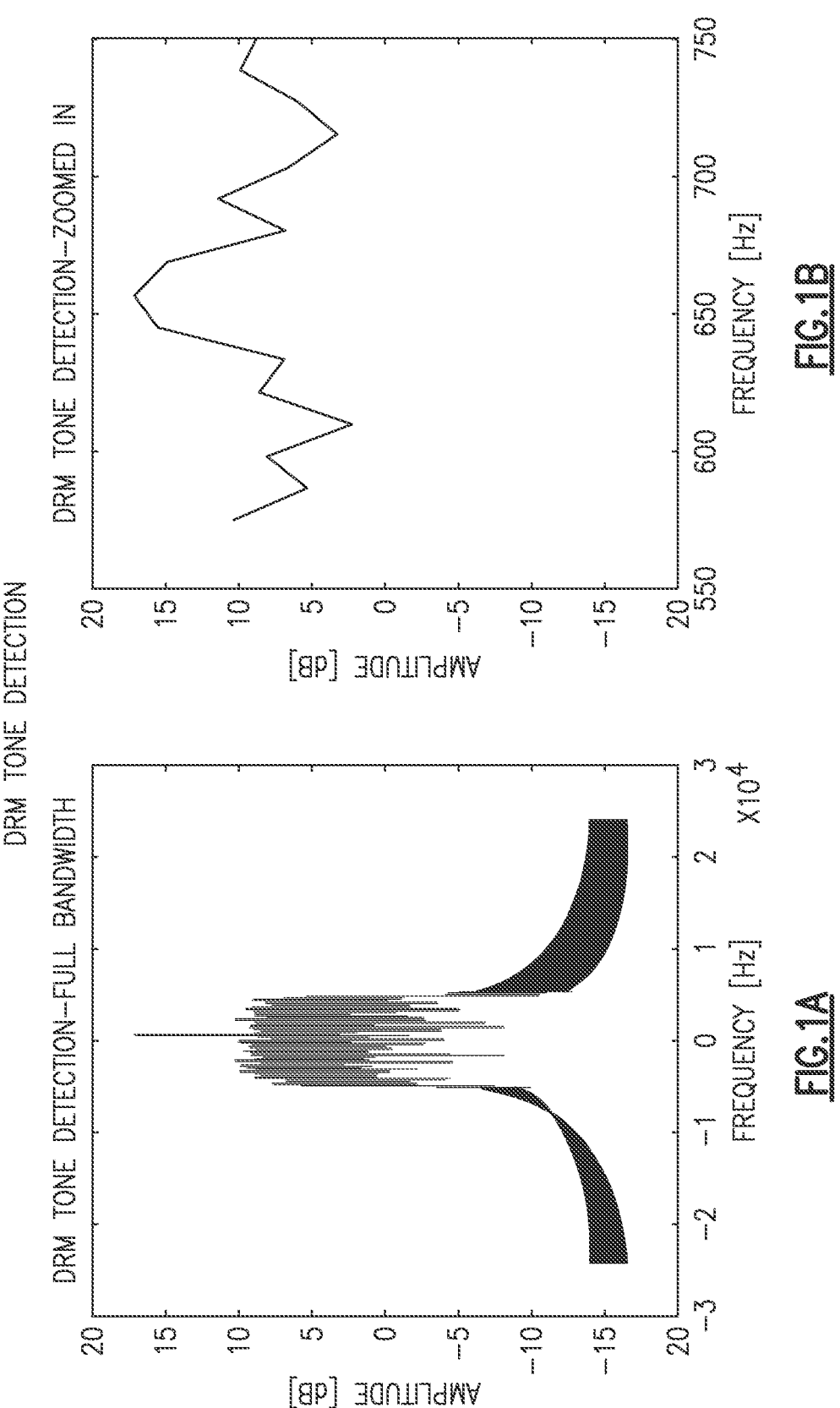
FIG. 1A is a graph of a simulated amplitude modulation (AM) co-channel interfering tone.
FIG. 1B is a zoomed in view of an interfering tone from the graph of FIG. 1A.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

This disclosure provides technical solutions for tracking and cancelling an interfering tone in orthogonal frequency division multiplexing (OFDM) systems. OFDM demodulator operation and correlations can be susceptible to interfering tones, which can lead to degradation of system performance. Certain methods of removing interfering tones can tradeoff between detection accuracy, incomplete tone removal, and implementation complexity. This disclosure provides an adaptable, low complexity, and high precision tracking and cancellation scheme without coarse tone detection on a symbol-by-symbol basis. Embodiments of this disclosure can be implemented in embedded systems.

OFDM systems can include a summation of complex sinusoids mapped from carriers across time and frequency boundaries. Interfering tones can come from various sources, points such as amplitude modulation (AM) carrier frequencies, electric motors, radio frequency (RF) switching circuits, etc. An OFDM system does not know whether an interfering tone is present in a received radio signal. However, OFDM systems generally decode received radio signals whether an interfering tone is present or not.

FIG. 1A is a graph of a simulated AM co-channel interfering tone. In FIG. 1A, the graph shows a full bandwidth of a Digital Radio Mondiale (DRM) signal. The DRM signal can be a DRM30 signal that utilizes AM broadcast bands below 30 megahertz (MHz). A DRM30 signal can enable long distance signal propagation. In FIG. 1A, an interfering tone is present at approximately +658 hertz relative to a carrier frequency of the DRM signal. FIG. 1B is a zoomed in view of the interfering tone from the graph of FIG. 1A.

When an interfering tone is present, for example as shown in FIGS. 1A and 1B, desired complex sinusoids can be mixed with this interfering tone. This can degrade the ability of a demodulator to properly estimate channel impairments and map constellation points, which can lead to low confidence log likelihood ratios (LLRs) culminating in errors during decoding. In the time domain, the interfering tone can cause correlations to fail.

Correlation failures can be present in cyclic prefix-based correlation where the peak correlation output is no longer related to the guard interval spacing, but instead correlating to the interfering tone present in the signal. This can cause the noise floor of the correlation to rise high enough to where the peak of the cyclic prefix correlation maximum output without the tone is masked in the presence of the cyclic prefix correlation with the tone present, for examples, as demonstrated in FIGS. 2A and 2B.

Figure 2:
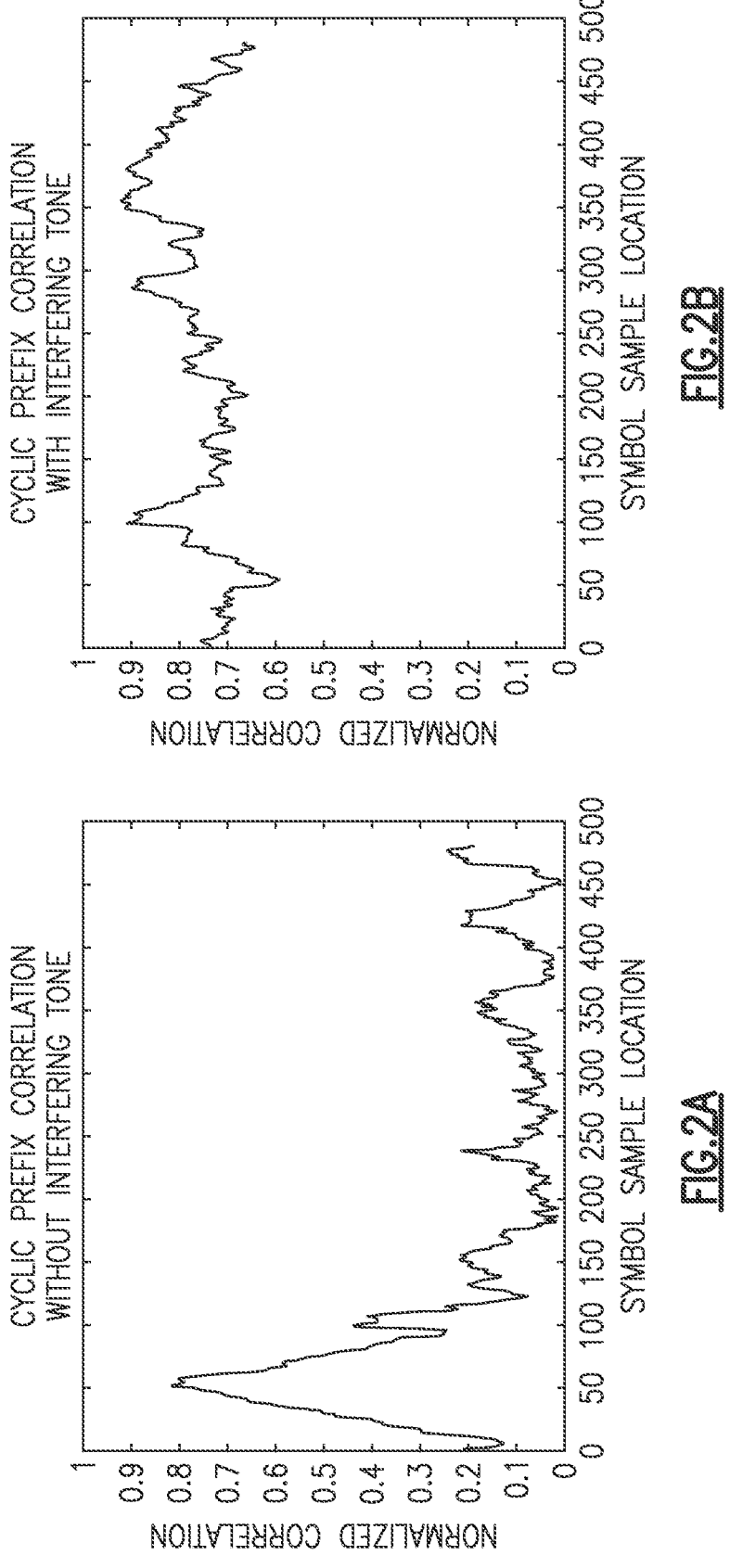
FIG. 2A is a graph of cyclic prefix correlation without an interfering tone.
FIG. 2B is a graph of cyclic prefix correlation with an interfering tone.

FIG. 2A is a graph of cyclic prefix correlation without an interfering tone. This graph is for a DRM signal that is a DRM+ signal that utilizes a broadcast band in a range from 30 MHz to 300 MHz. Without an interfering tone, the noise floor of the cyclic prefix correlation can be determined. FIG. 2B is a graph of cyclic prefix correlation with an interfering tone. The correlation in FIG. 2B masks the noise floor. This can be due to correlating with the interfering tone.

With an interfering tone, there can be system degradation. To reduce or eliminate such system degradation in the presence of an interfering tone, the interfering tone can be estimated and canceled.

Detecting combined with canceling an interfering tone can be insufficient for complete interference mitigation in relatively low complexity solutions and for achieving satisfactory system performance. High complexity solutions are often able to perform adequate detection and tone cancellation but can encounter technical challenges running in real-time on embedded system solutions.

One solution for cancelling interfering tones is a notch filter. Once the interfering tone location is detected, the notch filter can be set to the interfering tone frequency and the notice filter can remove the tone at the expense of OFDM carriers near the removed tone. Such an implementation with a narrow notch filter may be unable to produce error free decoded streams as this solution can degrade neighboring carriers more than desired.

Another solution is to null out the LLRs to corresponding carriers at and near the removed tone location. This can provide better performance, but can encounter challenges with consistently producing error free decoded streams.

A solution that can provide promising results is a very large fast Fourier transform (FFT) to detect and null the frequency bin and then converting back to the time domain via an inverse FFT (IFFT). However, this method can be unrealizable for embedded systems due to a relatively high complexity of implementation and memory usage.

One more solution is provided in U.S. Pat. No. 11,381, 267, the disclosure of which is hereby incorporated by reference in its entirety and for all purposes. This solution can utilize a design in which a tone location is coarsely estimated every OFDM symbol, and a finer resolution discrete Fourier transform (DFT) can provide a finer tone location estimation. Such a routine can simplify estimation such that the initial estimated location can be less accurate and then followed by a lower complexity iterative DFT search routine to detect the interfering tone location more accurately. This solution can involve the initial tone location estimation routine being run each OFDM symbol in an open loop manner as well as an iterative search algorithm.

Aspects of this disclosure relate to a closed loop tone tracking portion of a tone removal process. This closed loop solution is different than open loop architectures. An initial interfering tone can be detected in a first OFDM symbol. Since the interfering tone can move relatively slowly, the interfering tone can be in generally the same or a similar location relative to the receive bandwidth in consecutive OFDM symbols. A vector can be generated for a second OFDM symbol based on the estimate of the interfering tone of the first OFDM symbol, where the first and second OFDM symbols are consecutive symbols. An interfering tone in the second OFDM symbol can be estimated based on computing frequency components of the vector and determining the frequency component having a greatest magnitude. Then the interfering tone can be cancelled in the second OFDM symbol. Interfering tone cancellation can be performed in subsequent OFDM symbols after the second OFDM symbol. Such a tone cancellation process can be performed on multiple OFDM symbols based on an initial tone estimation and a closed loop tone tracking process that estimates an interfering tone in a relatively small portion of the OFDM symbol bandwidth around the location of the interfering tone in the previous OFDM symbol. This method can accurately estimate an interfering tone with relatively low complexity. In addition, a coarse tone detection within the OFDM symbol bandwidth can be performed one time for tone detection in a plurality of OFDM symbols.

Figure 3:
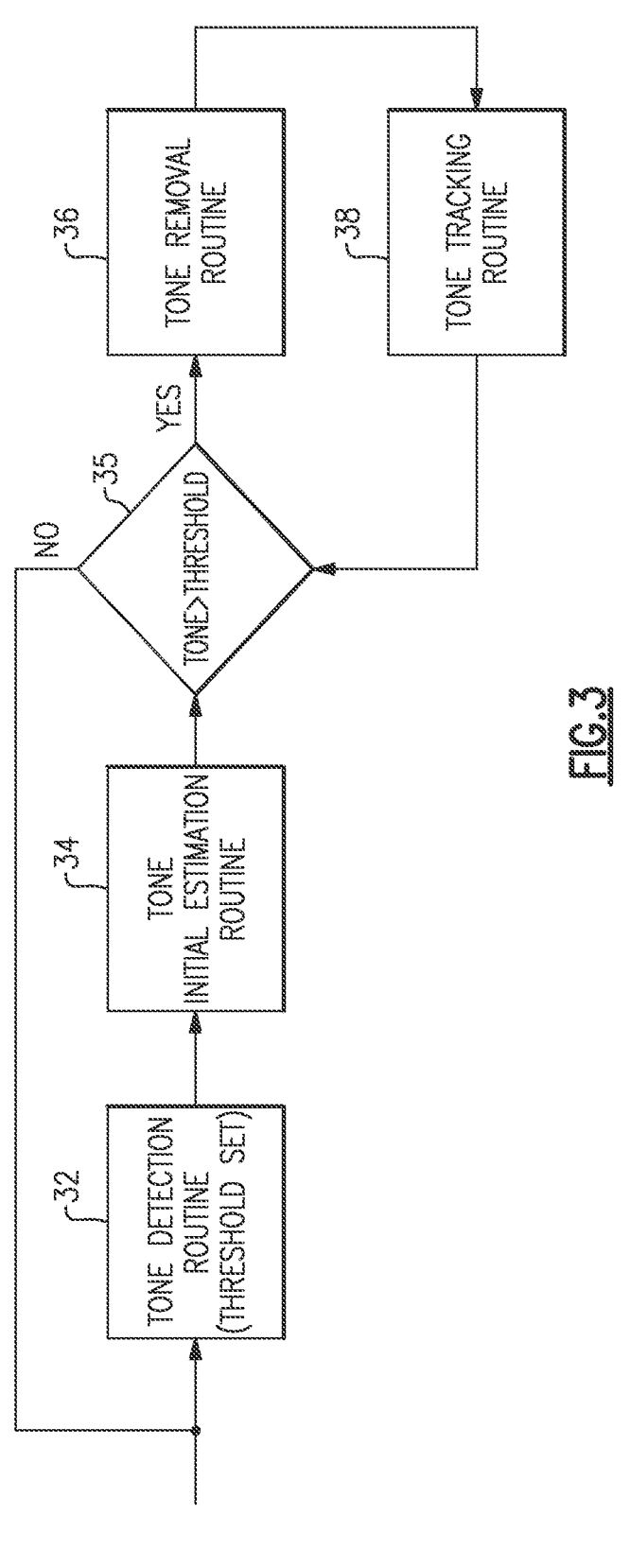
FIG. 3 is a schematic block diagram of tone detection and removal circuitry according to an embodiment.

FIG. 3 is a schematic block diagram of tone detection and removal circuitry 30 according to an embodiment. The tone detection and removal circuitry 30 can perform an initial tone estimation and a closed loop tone tracking in a tone cancellation process. As illustrated, the tone detection and removal circuitry 30 can include a tone detection circuit 32, an initial tone estimation circuit 34, a tone threshold circuit 35, a tone removal circuit 36, and a tone tracking circuit 38. The tone detection and removal circuitry 30 can be implemented by any suitable digital signal processing circuitry. For example, a digital signal processor (DSP) can implement the tone detection and removal circuitry 30. The tone detection and removal circuitry 30 can be baseband processing circuitry. The tone detection and removal circuitry 30 can be included in an embedded system.

The tone detection and removal circuitry 30 can receive time domain OFDM symbols of a digital radio signal. An interfering tone in an initial OFDM symbol can be detected and estimated. The tone detection circuit 32 can set a threshold for detecting the interfering tone. The initial tone estimation circuit 34 can determine an estimate of a location of the interfering tone in the initial OFDM symbol. This can determine an estimated location of the interfering tone within an entire bandwidth of the OFDM symbol. The initial tone estimation circuit 34 can implement any suitable principles and advantages of tone estimation disclosed in U.S. Pat. No. 11,381,267, for example.

The tone threshold circuit 35 can determine whether the initial OFDM symbol includes an interfering tone that satisfies (e.g., is greater than or greater than or equal to) the threshold set by the tone detection circuit 32. If a magnitude of the interfering tone is below the threshold, the tone detection and removal circuitry 30 can determine not to cancel the interfering tone. In such a case, the tone detection circuit 32 and the initial tone estimation circuit 34 can process the next OFDM symbol. If the magnitude of the interfering tone is above the threshold, the interfering tone can be removed from the initial OFDM symbol by the tone removal circuit 36. The tone removal circuit 36 can cancel the interfering tone in an OFDM symbol. Such cancellation can significantly reduce the impact of the interfering tone on downstream processing of the OFDM symbol. The cancellation may not completely cancel the interfering tone but be sufficient to reduce or eliminate one or more errors in downstream processing. The tone removal circuit 36 can implement any suitable method of tone cancellation.

A closed loop tone tracking and removal process can be performed on subsequent OFDM symbols following the initial OFDM symbol. This closed loop process can track the interfering tone in a subsequent OFDM symbol based on the estimate of the interfering tone in an immediately preceding OFDM symbol. The tone tracking circuit 38 can detect an interfering tone in the subsequent OFDM symbol based on the estimate of the interfering tone in the immediately preceding OFDM symbol. If the tone threshold circuit 35 determines that an interfering tone in the subsequent OFDM symbol is above the threshold, the tone removal block 36 can remove the interfering tone in the subsequent OFDM symbol. Then the closed loop tone tracking and removal process can continue with the tone tracking circuit 38 detecting an interfering tone in the next OFDM symbol. If the tone threshold circuit 35 determines that interfering tone in the next OFDM symbol is below the threshold, the tone detection circuit 32 and initial tone estimate circuit 34 can detect a location of an interfering tone in the next OFDM symbol.

A tone detection routine and the initial estimation routine can complete one iteration and estimate a location of an interfering tone. This can be performed by the tone detection circuit 32 and the initial tone estimation circuit 34. The tone tracking circuit 38 can generate a vector based on the estimated interfering tone in the initial OFDM symbol in a subsequent OFDM symbol immediately following the initial OFDM symbol.

A frequency bin index $k_{max}$ can be associated with the maximum power detected within an OFDM symbol boundary. A frequency value $f_{k_{max}}$ can correspond to a maximum power detected within an OFDM symbol boundary on a previous iteration at location $k_{max}$. In a general case, a vector $\vec{f}$ can be represented as:

$$\vec{f} = (f_1, f_2, \ldots , f_{k_{max}}, f_{L-1}, f_L)$$

The values in $\vec{f}$ can be any suitable values, fractional or integer, if:

$$f_{k_{max}} \in \vec{f}$$

A vector $\vec{f}$ of values centered at an estimated tone location $k_{max}$ with fractional frequency bin spacing $b_s$ and a count c of fractional bins of either side of the estimated tone location $k_{max}$ can be represented by Equation 1:

$$\vec{f} = f_{k_{max}} + (-c*b_s : b_s : c*b_s)\big|_{b_s < \frac{F_s}{N_{FFT}}} \qquad \text{(Equation 1)}$$

In Equation 1, $\vec{f}$ has a length of 2*c+1, $F_s$ is the sampling frequency, and $N_{FFT}$ is the length of the FFT used in detection of the interfering tone. The vector $\vec{f}$ can include values corresponding to equally spaced frequencies around frequency value $f_{k_{max}}$. In the case of equal bin spacing, $f_{l+1}-f_l=b_s$ for any l. In some other implementations, $f_2-f_1$ can be bigger than $f_3-f_2$ and the smallest distance in the frequency domain between values can be for frequencies closest to $f_{k_{max}}$.

The tone tracking circuit 38 can compute frequency components of the vector $\vec{f}$. A hardware DFT block can be used to calculate the corresponding frequency components for vector $\vec{f}$ represented in Equation 2A:

$$Z[\vec{f}] = \sum_{n=0}^{N_{FFT}-1} x[n] * e^{\frac{-j2\pi n \vec{f}}{N_{FFT}}} \qquad \text{(Equation 2A)}$$

In Equation 2A, $Z[\vec{f}]$ is a vector of values: $(Z[f_1], Z[f_2], \ldots Z[f_L])$. Value $Z[f_1]$ can be computed using Equation 2B:

$$Z[f_i] = \sum_{n=0}^{N_{FFT}-1} x[n] * e^{\frac{-j2\pi n f_i}{N_{FFT}}} \qquad \text{(Equation 2B)}$$

The tone tracking circuit 38 can determine the frequency component of the frequency components with the greatest magnitude to determine the location of the interfering tone in the subsequent OFDM symbol. The position of the fractional frequency bin with the maximum power and the value of the bin can be:

$$v_{max} = \underset{l \in 1:L}{\operatorname{argmax}}(|Z[f_i]|^2) \qquad \text{(Equation 3)}$$

$$zval_{max} = Z[v_{max}] \qquad \text{(Equation 4)}$$

To reduce system resource utilization, the estimated tone position in the frequency domain $v_{max}$ from the previous OFDM symbol can be saved in memory. The tone position in the frequency domain $v_{max}$ from the previous OFDM symbol can be used as the estimated tone location $k_{max}$ for the vector calculated in Equation 1 to perform tone tracking for the next OFDM symbol. This can rely on the fact that the interfering tone in a relatively large number of digital receiver-based systems is generally stationary relative to the received bandwidth period of the target transmission.

Figure 4:
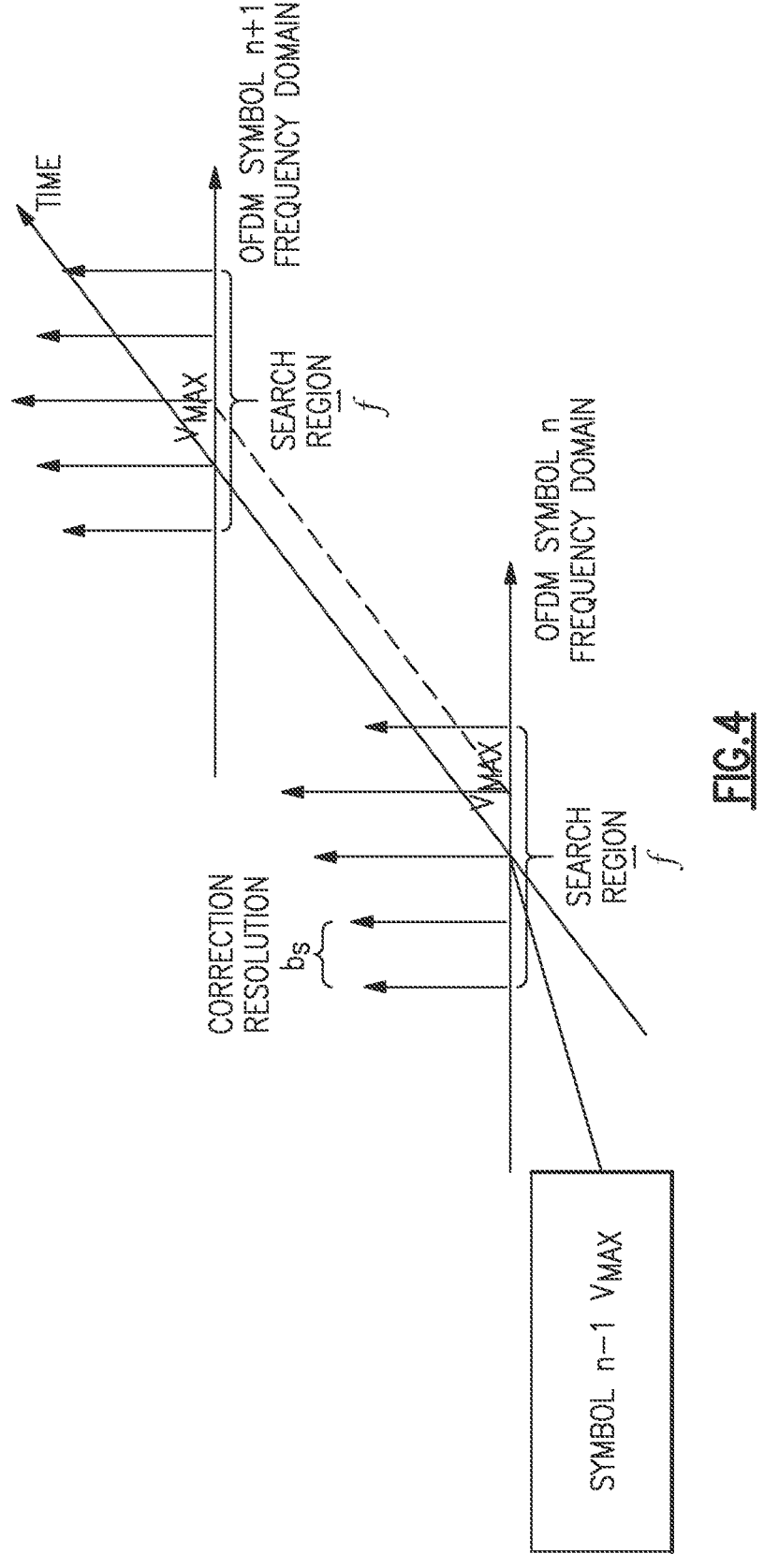
FIG. 4 is a visualization of a tracking routine search region moving to a new vector on a subsequent symbol according to an embodiment.

FIG. 4 is a visualization of a tracking routine search region moving to a new vector on a subsequent symbol according to an embodiment. FIG. 4 illustrates components of vectors $\vec{f}$ for OFDM symbols in the frequency domain. A vector for an OFDM symbol can be centered at an interfering tone location in the frequency domain of a previous OFDM symbol. The value of a vector having the greatest magnitude can estimate where the interfering tone is located in the frequency domain for the OFDM symbol.

The assumption that the interfering tone is relatively stationary is used to size the width of the tracking DFT to be such that the outer edges are set to the coherent bandwidth of the expected interfering signal. It is assumed that the vector $\vec{f}$ is properly spaced such that the interfering tone does not move more than $c*b_s$ fractional frequency bins between adjacent symbols while in the tone tracking routine, where $b_s$ represents bin spacing and c represents the number of frequency bins of the vector $\vec{f}$. This can allow the system to skip the coarse tone detection routine and track the interfering tone with the parallel DFT implementation in Equation 2A where the intermediate frequency estimation bins in the DFT can serve to estimate a more precise location of the tone, allow relatively small drift of the tone to be tracked and corrected, and reduce the cycle utilization of the tone detection and removal.

The closed loop tone detection can be used for a specified number of contiguous OFDM symbols and then the initial tone detection routine can be performed after the end of a sequence. This can mitigate or prevent tracking drift and/or reestablish threshold criteria to more closely model statistics of the current signal.

A vector $\vec{f}$ can have any suitable spacing $b_s$ and/or the number of frequency bins c for a particular application. In certain embodiments, one or more additional control loops can be added to dynamically configure the spacing $b_s$ and/or the number of frequency bins c of the vector $\vec{f}$. This can further reduce system resource usage when the interfering tone is in a more static state.

Accordingly, a tone removal process can be performed by estimating the initial tone frequency once and then using a relatively low complexity tracking routine in subsequent iterations to manage tone rejection with higher precision and configurability than certain previous solutions.

Figure 5:
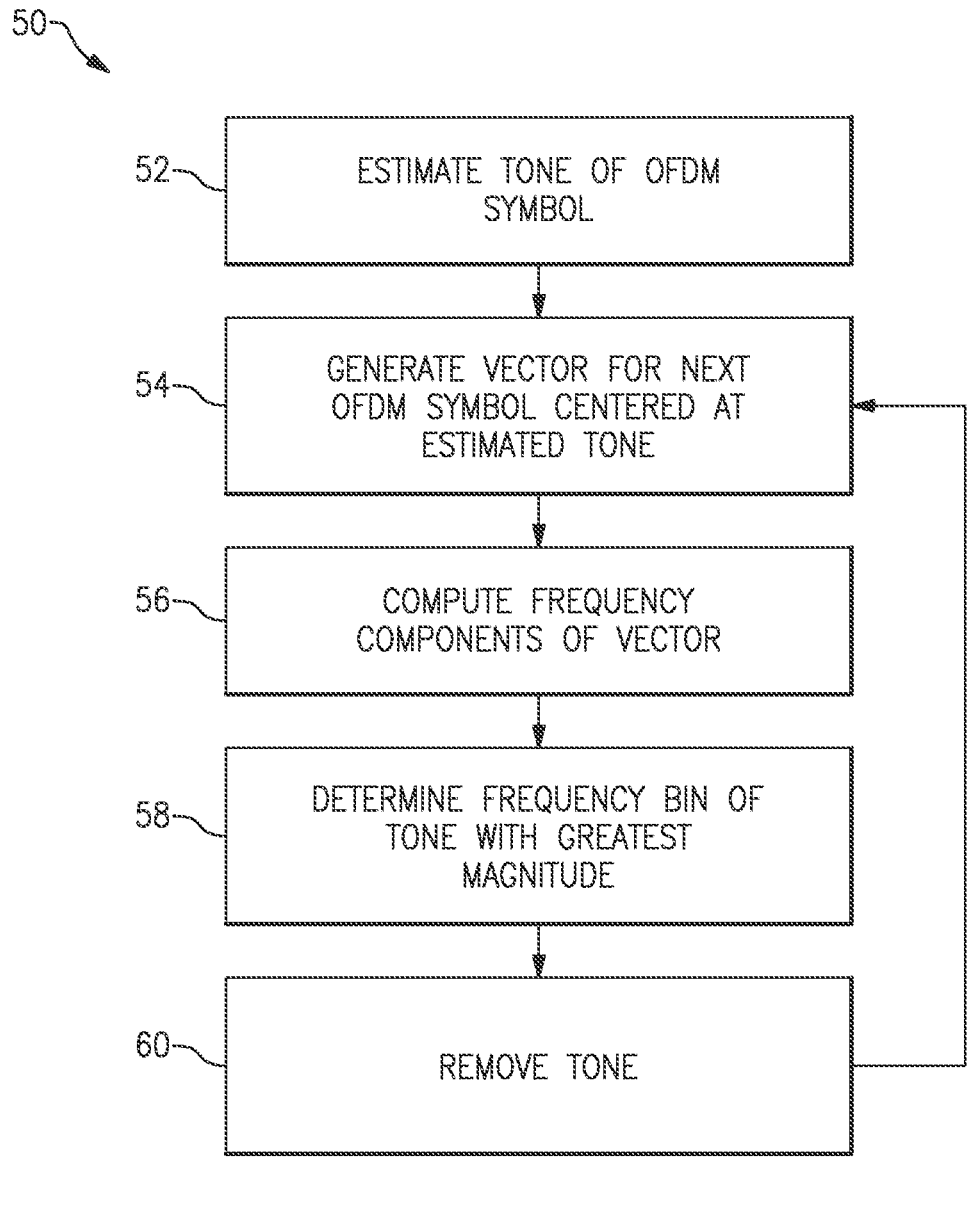
FIG. 5 is a flow diagram of a method of tone removal according to an embodiment.

FIG. 5 is a flow diagram of a method 50 of tone removal according to an embodiment. The method 50 can be performed using the tone detection and removal circuitry 30 of FIG. 3, for example. An interfering tone of an OFDM symbol can be estimated at block 52. The interfering tone can be estimated within a full bandwidth of the OFDM symbol. A vector $\vec{f}$ can be generated for the next OFDM symbol at block 54. The vector $\vec{f}$ can be centered at the estimated tone of the prior OFDM symbol. The vector $\vec{f}$ can be implemented in accordance with any suitable principles and advantages discussed above. For example, the vector $\vec{f}$ can be as defined in Equation 1. The frequency components of the vector $\vec{f}$ can computed at block 56. For example, a DFT engine can perform such a computation. A frequency bin with the greatest magnitude can be determined at block 58. This can determine the location of an interfering tone in the OFDM symbol. Then the interfering tone can be removed at block 58. The method 50 can then detect and remove an interfering tone in subsequent OFDM symbols based on the determined location of an interfering tone in the immediately preceding OFDM symbol. This can involve performing the actions at blocks 54 to 58 for subsequent OFDM symbols. The operations at blocks 54 to 58 can be closed loop operations.

Figure 6:
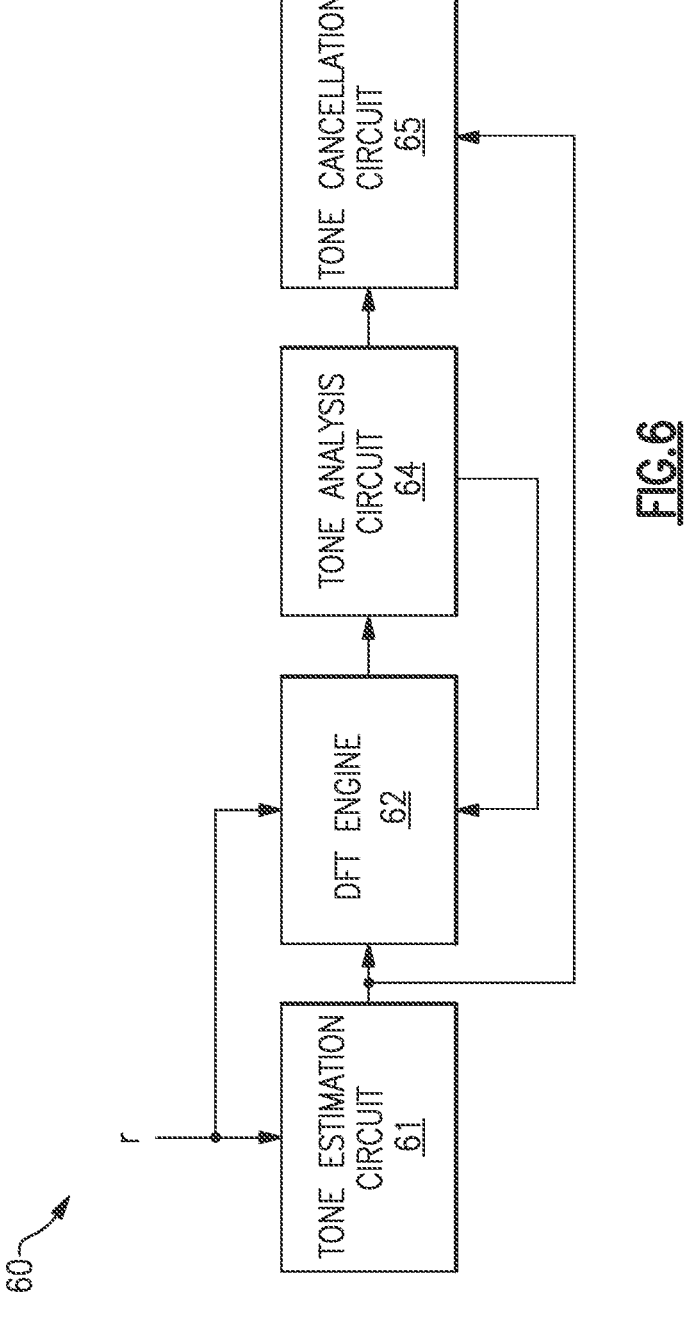
FIG. 6 is a schematic block diagram of tone estimation and removal circuitry according to an embodiment.

FIG. 6 is a schematic block diagram of tone estimation and removal circuitry 60 according to an embodiment. As illustrated, a time domain OFDM signal r that includes OFDM symbols can be received by the tone estimation and removal circuitry 60. A tone estimation circuit 61 can estimate an interfering tone in an OFDM symbol. The tone estimation circuit 61 can perform tone estimation on an initial OFDM symbol and a closed loop can determine location of an interfering tone in subsequent OFDM symbols without tone estimation being performed on the subsequent OFDM symbols. The closed loop can include a DFT engine 62, and a tone analysis circuit 64. The DFT engine 62 can generate a vector $\vec{f}$ for an OFDM symbol based on the location of an interfering tone in a previous OFDM symbol. The DFT engine 62 can compute a frequency response at points of the vector $\vec{f}$ from time domain samples. The vector $\vec{f}$ can include values generated by the DFT engine 62 that are centered around an estimated interfering tone from a previous OFDM symbol in the frequency domain The vector $\vec{f}$ corresponds to a portion of an OFDM symbol bandwidth. The tone analysis circuit 64 can determine the location of the interfering tone in the frequency domain based on the greatest magnitude component of vector $\vec{f}$ in the frequency domain. A tone cancellation circuit 65 can cancel the interfering tone in an OFDM symbol based the location of the tone determined by the tone analysis circuit 64. The tone cancellation circuit 65 can cancel the interfering tone in an OFDM symbol based the location of the tone estimated by the tone estimation circuit 61.

Although embodiments disclosed herein may be discussed with reference to canceling one interfering tone, any suitable principles and advantages disclosed herein can be applied to canceling two or more interfering tones in an OFDM symbol. Tone detection and removal circuitry can be cascaded for canceling more than one interfering tone.

Figure 7:
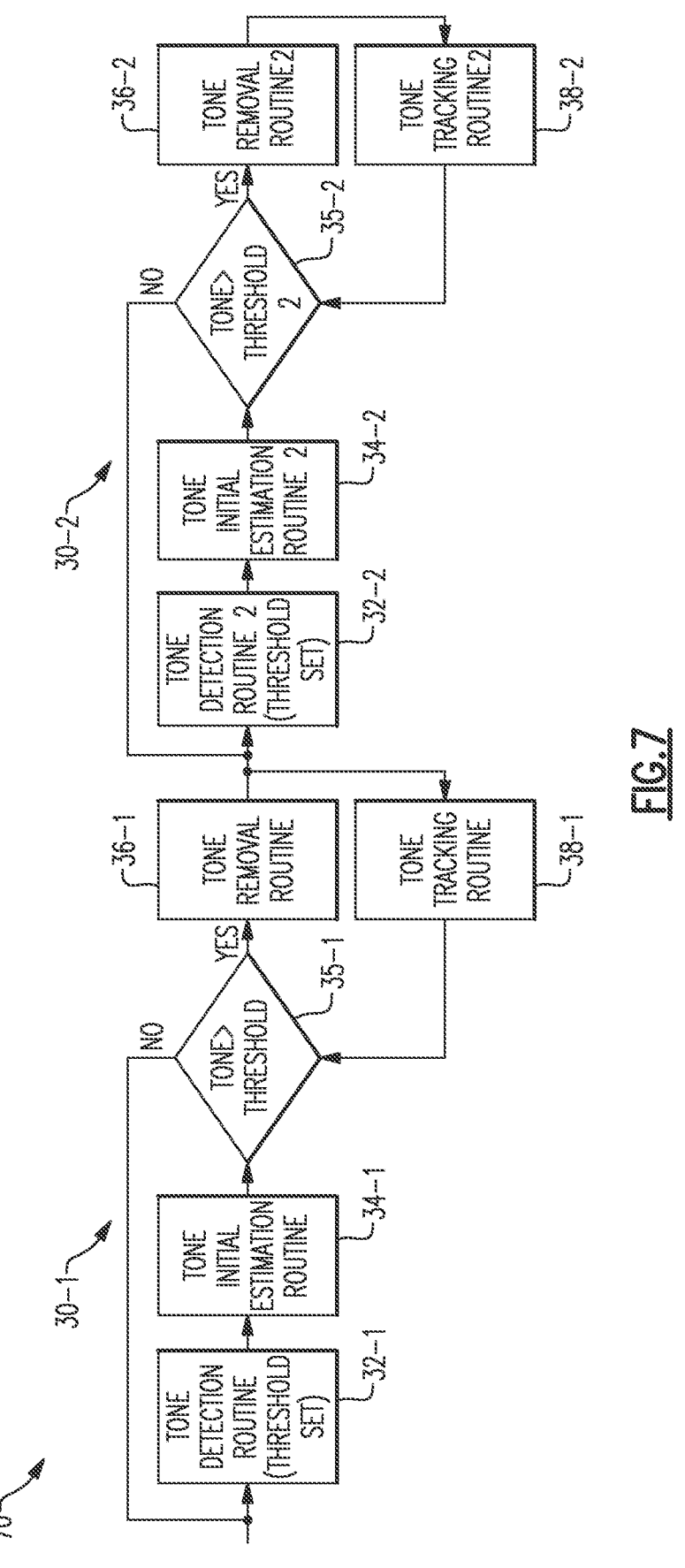
FIG. 7 is a schematic block diagram of tone detection and removal circuitry for removing a plurality of interfering tones according to an embodiment.

FIG. 7 is a schematic block diagram of tone detection and removal circuitry 70 for removing a plurality of interfering tones according to an embodiment. The illustrated tone detection and removal circuitry 70 can detect and remove two interfering tones. The tone detection and removal circuitry 70 includes two instances of the tone detection and removal circuitry 30 of FIG. 3 cascaded with each other. A first instance of the tone detection and removal circuitry 30-1 can detect and cancel a first interfering tone. The first interfering tone can be a largest interfering tone in an OFDM symbol. A second instance of the tone detection and removal circuitry 30-2 can detect and cancel a second interfering tone. The second interfering tone can be a next largest interfering tone in an OFDM symbol. A threshold for detecting the second interfering tone can be lower than a threshold for the first interfering tone. The second instance of the tone detection and removal circuitry 30-2 can process OFDM symbols with the first interfering tone already removed by the first instance of the tone detection and removal circuitry 30-1. Although the tone detection and removal circuitry 70 of FIG. 7 can remove two interfering tones, any suitable principles and advantages disclosed herein can be applied to canceling three or more interfering tones.

Embodiments can be implemented in a variety of receiver implementations for detecting and removing tone interference, particularly for incoming OFDM communications. Embodiments can be implemented with a variety of digital radio communication specifications including without limitation DRM, DAB, NRSC-5C, or CDR. In certain applications, any suitable principles and advantages disclosed herein can be implemented in connection with one or more other digital communication techniques, including without limitation digital television (e.g., one or more Digital Video Broadcasting (DVB) standards), Integrated Digital Services Broadcasting (IDSB), cellular techniques such as Long Term Evolution (LTE) and/or fifth generation (5G) New Radio (NR), or other OFDM signaling techniques.

Figure 8:
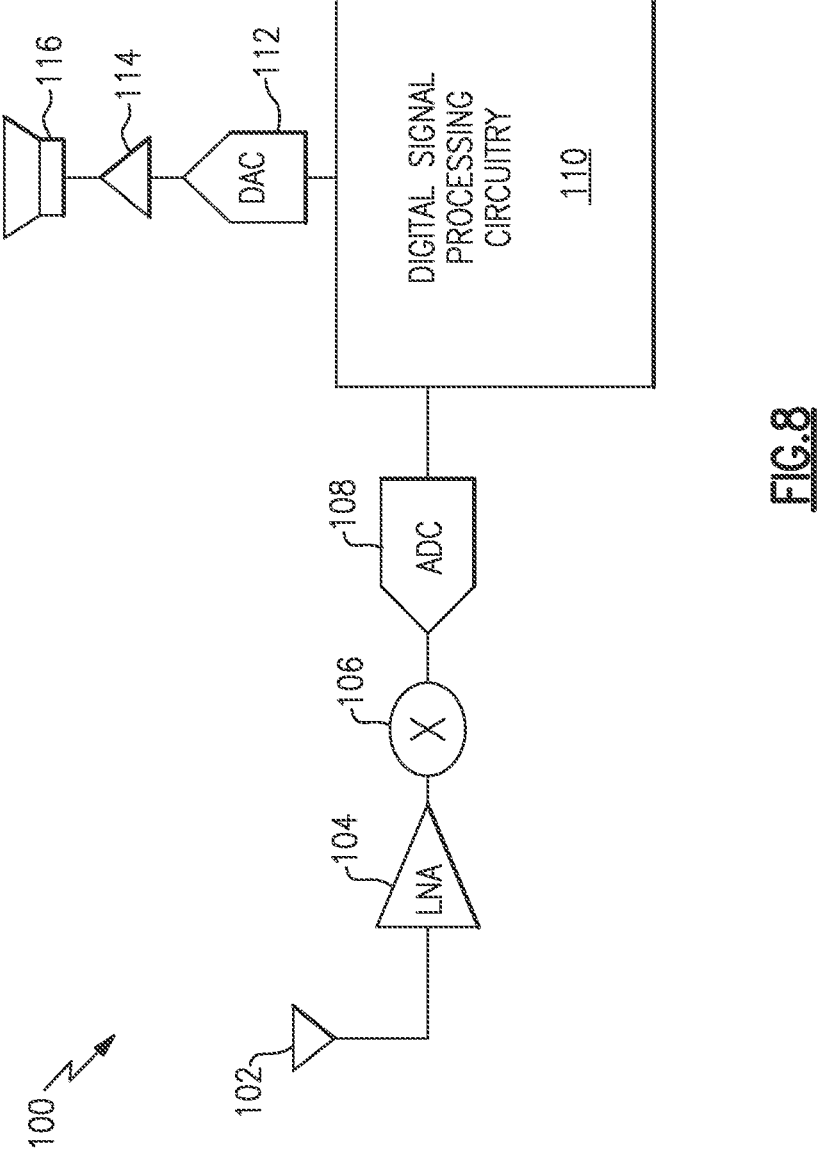
FIG. 8 is a schematic diagram of an example radio system according to an embodiment.

FIG. 8 is a schematic diagram of an example radio system 100 according to an embodiment. The radio system 100 can receive and process a digital radio signal. The radio system 100 can generate audio from the digital radio signal. The radio system 100 can process a digital radio signal can be in accordance one or more suitable digital radio standards, such as one or more of National Radio System Committee (NRSC-5C, also known as HD™ radio), Digital Audio Broadcasting (DAB), Digital Radio Mondiale (DRM), Convergent Digital Radio (CDR), or another digital radio standard. As illustrated, the radio system 100 includes an antenna 102, a low noise amplifier 104, an analog-to-digital converter (ADC) 108, digital signal processing circuitry 110, a digital-to-analog converter (DAC) 112, an amplifier 114, and a speaker 116. The radio system 100 is an example system that can perform tone detection and cancellation in accordance with any suitable principles and advantages disclosed herein. The radio system 100 can be implemented in a vehicle in certain applications.

With reference to the radio system 100 of FIG. 8, a radio frequency signal that includes a digital radio signal according to a given digital broadcast specification can be received via the antenna 102. In some instances, the radio frequency signal can be received via two or more antennas.

A radio frequency signal received via the antenna 102 can be processed by a receive signal path and provided to the digital signal processing circuitry 110. The radio frequency signal path includes at least a low noise amplifier (LNA) 104, a mixer 106, and an ADC 108. In some instances, the radio frequency signal path can include additional circuit elements, such as one or more filters, one or more amplifiers with automatic gain control, etc. A radio frequency signal received via the antenna 102 can be amplified by the LNA 104. The amplified RF signal can be downconverted by the mixer 106. The downconverted signal generated by the mixer 106 can be a low-intermediate frequency (IF) or zero-IF signal, for example. The downconverted signal can include an in-phase/quadrature phase (IQ) signal. The ADC 108 can digitize the downconverted signal into a digital signal.

The digital signal processing circuitry 110 can perform any suitable processing on the digitized signal provided by the ADC 108. For example, the digital signal processing circuitry 110 can perform processing described with reference to FIG. 9. The digital signal processing circuitry 110 can detect an interfering tone in accordance with any suitable principles and advantages disclosed herein. The digital signal processing circuitry 110 can also cancel the interfering tone. The digital signal processing circuitry 110 can generate an audio output signal.

The audio output signal can be converted from a digital signal to an analog signal by a digital-to-analog converted (DAC) 112. The analog audio signal can be amplified by amplifier 114. The amplified analog audio signal can be provided to a speaker 116. The speaker 116 can output audio. While one speaker is shown in FIG. 8, audio can be output from any suitable number of speakers based on one or more audio signals provided by the digital signal processing circuitry 110.

Figure 9:
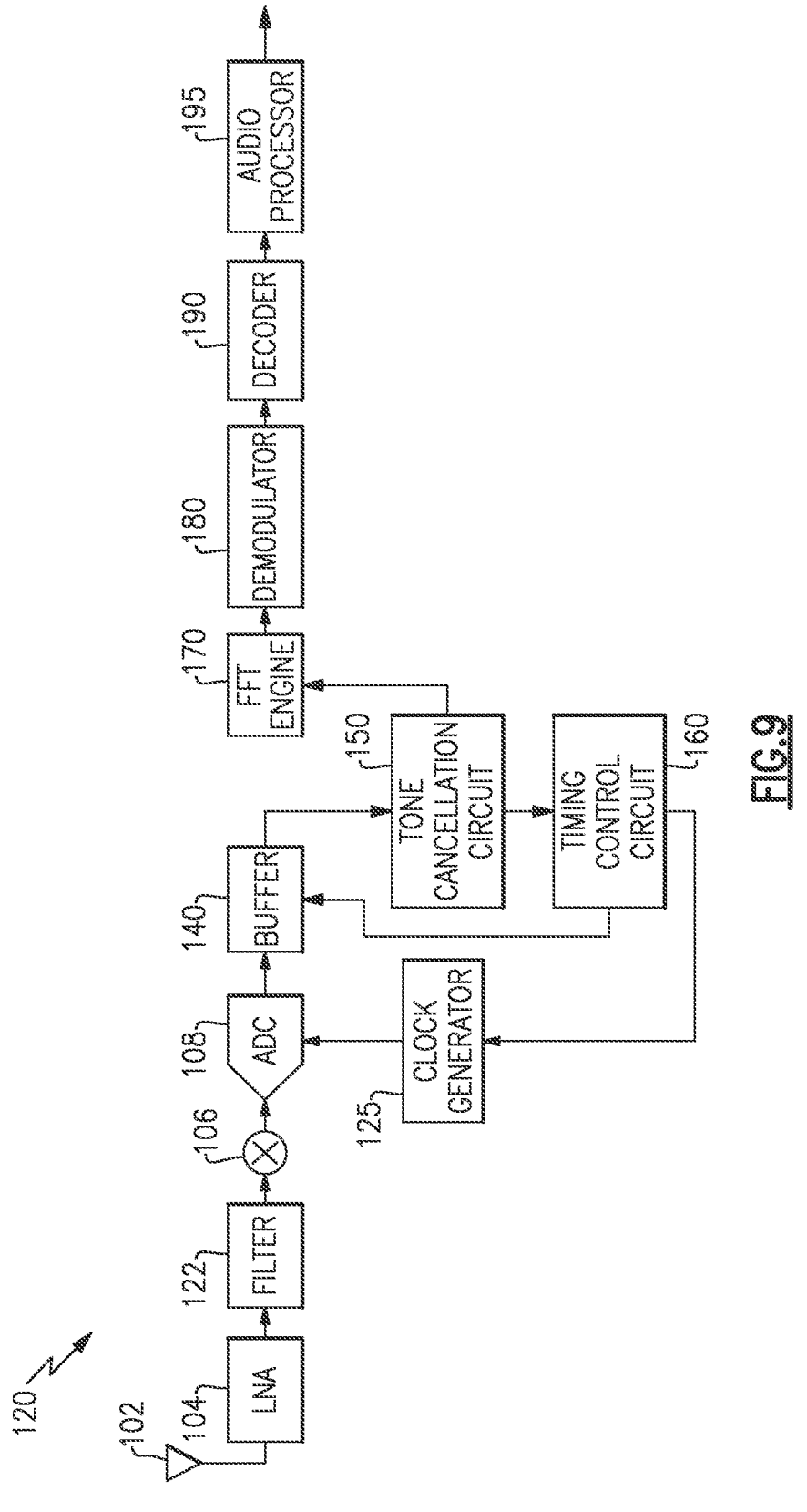
FIG. 9 is a schematic diagram of a receiver according to an embodiment.

FIG. 9 shows an example of a receiver 120 that incorporates tone detection and cancellation in accordance with any suitable principles and advantages disclosed herein. In some embodiments, receiver 120 can be embodied in a single-die integrated circuit, such as a complementary metal oxide semiconductor (CMOS) die having mixed signal circuitry including both analog and digital circuitry. According to some other embodiments, the receiver 120 can be implemented by two or more semiconductor dies.

As illustrated, the receiver 120 includes an antenna 102, an LNA 104, a filter 122, a mixer 106, an ADC 108, a clock generator 125, a buffer 140, a tone cancellation circuit 150, a timing control circuit 160, a fast Fourier transform (FFT)

engine 170, a demodulator 180, a decoder 190, and an audio processor 195. The buffer 140, the tone cancellation circuit 150, the timing control circuit 160, the FFT engine 170, the demodulator 180, the decoder 190, and the audio processor 195 can be included in the digital signal processing circuitry 110 of FIG. 8. The tone cancellation circuit 150 can detect and cancel one or more interfering tones in accordance with any suitable principles and advantages disclosed herein.

A radio frequency signal is received at the antenna 102. The LNA 104 amplifies the radio frequency signal. The filter 122 filters the amplified radio frequency signal provided by the LNA 104. The LNA 104 and the filter 122 can be considered radio frequency front end blocks. In certain applications, the receiver 120 can include additional radio frequency circuitry (not illustrated in FIG. 9). The mixer 106 can downconvert the filtered radio frequency signal provided by the filter 122 to a lower frequency signal. In certain applications, this lower frequency signal can a low-IF or zero-IF signal. The downconverted signal can be an IQ signal.

The ADC 108 can digitize the downconverted signal into a digital signal at a sampling rate based on a clock signal received from a clock generator 125. The clock generator 125 can be implemented as a local oscillator, phase lock loop, or another suitable clock generation circuit. In some applications, the sampling clock signal and a mixing signal provided to the mixer 106 are derived from the same clock signal. The clock signal from the clock generator 125 can be multiplied by a ratio to provide the mixing signal to mixer 106. In certain applications, either before or after digitization, channelization may be performed to generate a channelized signal. In an OFDM system, a plurality of samples can form an OFDM symbol of an incoming data stream.

The buffer 140 can receive the OFDM symbol. The buffer 140 can be a first in first out (FIFO) buffer. Incoming OFDM symbols can be stored in the buffer 140. The OFDM symbols stored in the buffer can be time domain OFDM symbols. These OFDM symbols can be provided to the tone cancellation circuit 150. The tone cancellation circuit 150 can identify and remove tone interference in accordance with any suitable principles and advantages disclosed herein. After interfering tone cancellation, samples are output to a main digital signal processing path including the FFT engine 170.

The FFT engine 170 can generate frequency domain OFDM symbols from incoming time domain OFDM symbols. In certain applications, each incoming time domain OFDM symbol can be processed by FFT engine 170 into a plurality of sub-carriers. The number of sub-carriers corresponding to a given OFDM symbol can vary depending on bandwidth of signal and a time duration of the OFDM symbol (without a cyclic prefix). While a single FFT engine is shown as part of a main signal processing path in FIG. 9, an additional FFT engine or DFT engine can be included in the tone cancellation circuit 150. In such implementations, an inverse FFT engine can be included in the tone cancellation circuit to transform frequency domain information back to the time domain before to being provided to FFT engine 170.

After tone cancellation, time domain OFDM symbols from the tone cancellation circuit 150 can also be provided to the timing control circuit 160. The timing control circuit 160 can perform timing estimation to determine a synchronization of the OFDM symbols. This timing estimation can be used to synchronize OFDM symbols in downstream digital processing circuitry. In some applications, the timing control circuit 160 can determine a timing estimate and provide control signals to the buffer 140 and/or the clock generator 125 to control timing. Accordingly, the timing control circuit 160 can function as a feedback circuit to control timing based on the OFDM symbols themselves. The timing control circuit 160 can compensate for symbol timing offset and/or sample rate offset. The timing control circuit 160 can provide a control signal to the clock generator 125 to adjust a clock signal provided to the ADC 108.

Referring to the main processing path, the sub-carrier outputs from FFT engine 170 can form a frequency division multiplexing symbol that is provided to the demodulator 180. The demodulator 180 can demodulate the sub-carrier outputs from the FFT engine 170 and provide demodulated sub-carriers. The demodulator 180 can be a sub-symbol decoder to produce one or several soft bits per sub-carrier. The decoder 190 can decode the demodulated sub-carriers from the demodulator 180. The decoder 190 can perform correction and/or information bit extraction. The output signal from the decoder 190 can be processed by the audio processor 195. The audio processor 195 can perform any suitable audio processing. The audio processor 195 can generate an encoded audio signal that is decoded in downstream circuitry (not illustrated in FIG. 9) to generate source audio. In the case of a data link, information bits may be provided to a data processor. Although shown as individual components, portions of the receiver 120 after ADC 108 to the end of the signal processing path of FIG. 9 can be implemented in a digital signal processor (DSP).

Other implementations are possible, and additional circuitry can be present. For example, in certain applications, additional circuitry can be implemented. In addition, circuitry for tone detection and correction may be configured in other types of hardware, may be realized via combinations of hardware, firmware, and/or instructions stored in memory executed by processing circuitry, and also may be implemented within a microcontroller or DSP.

Any of the embodiments described above can be implemented in radio systems. The principles and advantages of the embodiments can be used for any systems or apparatus, such as any radio receiver, that could benefit from any of the embodiments described herein. The teachings herein are applicable to a variety of systems. In certain applications, radio systems disclosed herein are implemented in vehicles such as automobiles. Although this disclosure includes some example embodiments, the teachings described herein can be applied to a variety of structures.

Aspects of this disclosure can be implemented in various electronic devices. Examples of the electronic devices can include, but are not limited to, consumer electronic products, parts of the consumer electronic products, radio receivers, wireless communication infrastructure, electronic test equipment, etc. Examples of the electronic devices can include, but are not limited to, a stereo system, a digital music player, a radio, a vehicular electronics system such as an automotive electronics system, etc. Further, the electronic devices can include unfinished products.

Unless the context indicates otherwise, throughout the description and the claims, the words "comprise," "comprising," "include," "including" and the like are to generally be construed in an inclusive sense, as opposed to an exclusive or exhaustive sense; that is to say, in the sense of "including, but not limited to." Conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively.

While certain embodiments have been described, these embodiments have been presented by way of example only, and are not intended to limit the scope of the disclosure. Indeed, the methods, systems, and circuits described herein may be embodied in a variety of other forms. Furthermore, various omissions, substitutions, and changes in the form of the methods, systems, and circuits described herein may be made without departing from the spirit of the disclosure. Any suitable combination of the elements and/or acts of the various embodiments described above can be combined to provide further embodiments. The accompanying claims and their equivalents are intended to cover such forms or modifications as would fall within the scope and spirit of the disclosure.

What is claimed is:

1. A method of tone cancellation for a radio signal, the method comprising:

generating an estimate of a location of an interfering tone in a first orthogonal frequency division multiplexing symbol;

detecting, using closed loop tone detection, an interfering tone in a second orthogonal frequency division multiplexing symbol based on the estimate of the location of the interfering tone in the first orthogonal frequency division multiplexing symbol; and canceling the interfering tone in the second orthogonal frequency division multiplexing symbol based on the detecting the interfering tone of the second orthogonal frequency division multiplexing symbol, the method performed using digital signal processing circuitry.

2. The method of claim 1 wherein the first and second orthogonal frequency division multiplexing symbols are consecutive orthogonal frequency division multiplexing symbols.

3. The method of claim 1 wherein the detecting includes generating a vector for a portion of a bandwidth of the second orthogonal frequency division multiplexing symbol based on the estimate of the location of the interfering tone, and determining a frequency component of the vector having a greatest magnitude.

4. The method of claim 3 wherein the vector is centered at the estimate of the location of the interfering tone in the first orthogonal frequency division multiplexing symbol.

5. The method of claim 1 further comprising detecting, using closed loop tone detection, an interfering tone in a third orthogonal frequency division multiplexing symbol based on the detecting the interfering tone in the second orthogonal frequency division multiplexing symbol.

6. The method of claim 1 further comprising detecting, using closed loop tone detection, an interfering tone in a plurality of additional orthogonal frequency division multiplexing symbols.

7. The method of claim 1 further comprising detecting, using closed loop detection, a second interfering tone in the second orthogonal frequency division multiplexing symbol and canceling the second interfering tone in the second orthogonal frequency division multiplexing symbol.

8. The method of claim 1 further comprising receiving a radio signal at one or more antennas, and processing the radio signal to generate the first orthogonal frequency division multiplexing symbol.

9. The method of claim 1 wherein the first orthogonal frequency division multiplexing symbol is generated from a received digital broadcast radio signal.

10. A radio system with tone cancellation, the radio system comprising:

at least one antenna configured to receive a radio signal; and a radio receiver configured to process the radio signal to generate orthogonal frequency division multiplexing symbols, the radio receiver including digital signal processing circuitry configured to generate an estimate of a location of an interfering tone in a first symbol of the orthogonal frequency division multiplexing symbols, determine an interfering tone in subsequent symbol of the orthogonal frequency division multiplexing symbols using closed loop tone detection that is based on the estimate of the location of the interfering tone in the first symbol, and cancel the interfering tone in the subsequent symbol.

11. The radio system of claim 10 wherein the digital signal processing circuitry is configured to detect the interfering tone in the subsequent symbol by at least generating a vector for a portion of a bandwidth of the subsequent symbol based on the estimate of the interfering tone, and determining a frequency component of the vector having a greatest magnitude.

12. The radio system of claim 11 wherein the vector is centered at the estimate of the location of the interfering tone in the first symbol.

13. The radio system of claim 10 wherein the digital signal processing circuitry is configured to detect, using closed loop tone detection, an interfering tone in a plurality of additional symbols of the orthogonal frequency division multiplexing symbols.

14. The radio system of claim 10 wherein the digital signal processing circuitry is configured to detect, using closed loop detection, a second interfering tone in the subsequent symbol.

15. The radio system of claim 10 wherein the radio signal is a digital broadcast radio signal.

16. The radio system of claim 10 wherein the first symbol and the subsequent symbol are consecutive symbols of the orthogonal frequency division multiplexing symbols.

17. Digital signal processing circuitry for tone cancellation, the digital signal processing circuitry comprising:

a tone estimation circuit configured to generate an estimate of an interfering tone of a first orthogonal frequency division multiplexing symbol;

a Fourier transform engine configured to generate a vector for a portion of a bandwidth of a second orthogonal frequency division multiplexing symbol based on the estimate of the interfering tone of the first orthogonal frequency division multiplexing symbol, the vector including frequency domain components; and a tone cancellation circuit configured to cancel the interfering tone in the second orthogonal frequency division multiplexing symbol based on a frequency component of the frequency domain components having a greatest magnitude.

18. The digital signal processing circuitry of claim 17 wherein the vector is centered at the estimate of the interfering tone of the first orthogonal frequency division multiplexing symbol.

19. The digital signal processing circuitry of claim 17 further comprising a tone analysis circuit configured to determine the frequency component having the greatest magnitude.

20. The digital signal processing circuitry of claim 19 wherein the Fourier transform engine configured to generate a vector for a portion of a bandwidth of a third orthogonal frequency division multiplexing symbol based on the frequency component having the greatest magnitude.

* * * * *